G. H. SELLERS.
Machine for Straightening Iron Bars.
No. 42,051.
Patented March 22, 1864.
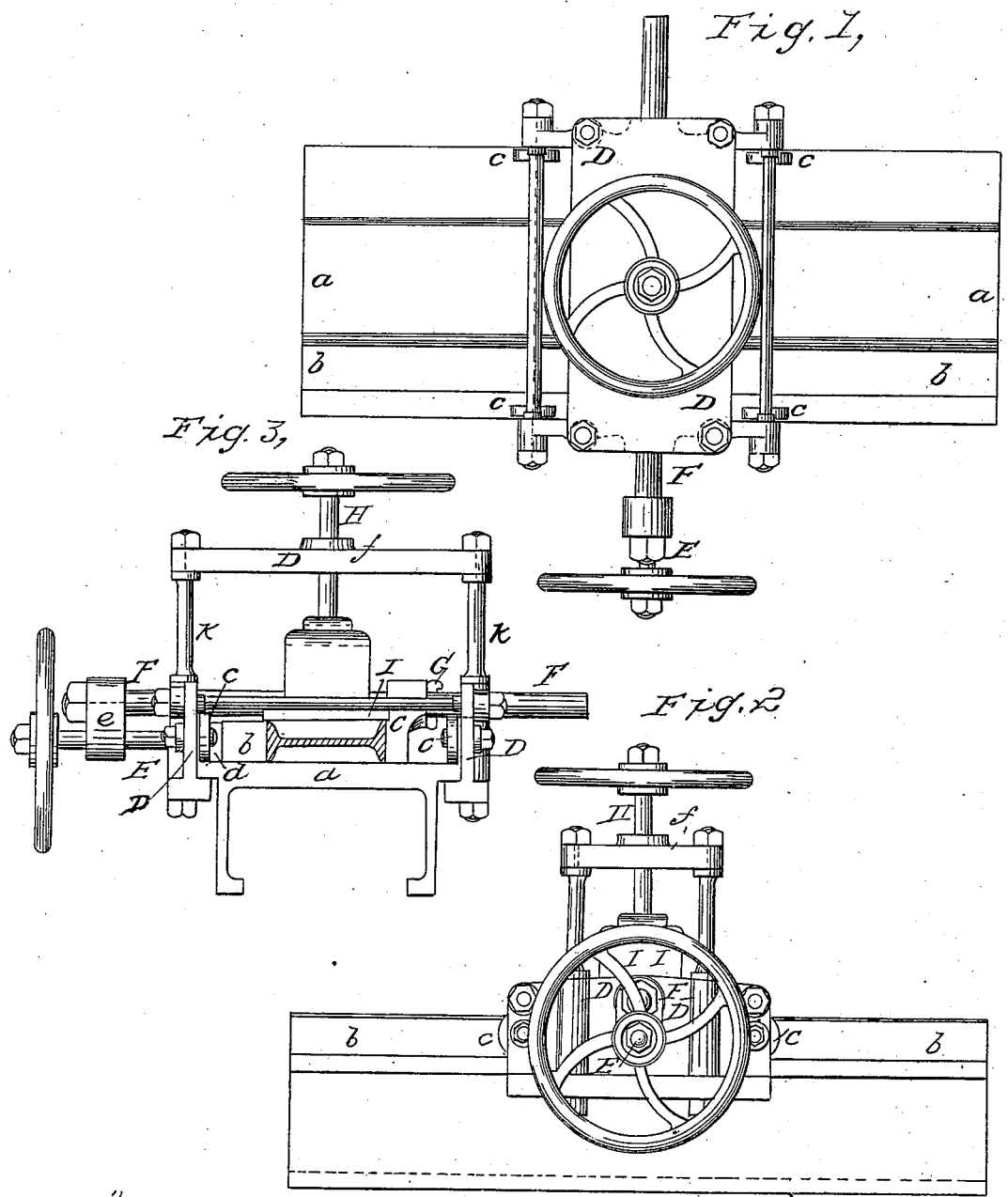

UNITED STATES PATENT OFFICE.

GEORGE H. SELLERS, OF PHŒNIXVILLE, PENNSYLVANIA, ASSIGNOR TO THE PHŒNIX IRON COMPANY, OF SAME PLACE.

IMPROVEMENT IN MACHINES FOR STRAIGHTENING IRON BARS.

Specification forming part of Letters Patent No. 42,051, dated March 22, 1864.

*To all whom it may concern:*

Be it known that I, GEORGE H. SELLERS, of Phœnixville, in the county of Chester and State of Pennsylvania, have invented a new and useful Machine for Straightening Iron and other Bars; and I do hereby declare the following to be a full, clear, and exact description of the construction and operation of the same, reference being had to the accompanying drawings, making a part of this specification, in which—

Figure 1 represents a top plan of the machine. Fig. 2 represents a side elevation, and Fig. 3 represents an end elevation thereof.

Similar letters of reference, where they occur in the separate figures, denote like parts of the machine in all the drawings.

In rolling plates, beams, bars, and other flat iron, the difficulty of straightening them while hot has been one which every manufacturer has had to encounter and contend with. I overcome this by my peculiar method of handling the iron after it is rolled; and my invention consists in the straightening of plates, beams, or bars as they come hot from the rolls by means of a movable carriage working over a straightening-plate, and having a vertical or horizontal screw, or both, for forcing the hot bar up against or between straight-edges.

To enable others skilled in the art to make and use my invention, I will proceed to describe the same with reference to the drawings.

$a$ $a$ represent a bed-plate planed off true, on the top of which, and at a short distance from one edge of which, is placed a straight-edge, $b$, which may be fastened to the bed-plate by bolts, dowel pieces, or it may be cast therewith, as preferred.

D represents a movable carriage, the wheels $c$ $c$ of which run upon the opposite edges of the bed-plate. In this carriage is placed a screw, E, the step $d$ of which acts against the straight edge $b$. The nut $e$ of this screw is an arm attached to the movable bar F, placed above the screw E, and passing through the sides of the carriage D. Between the sides of the carriage on the bar F is placed an arm, C, which extends downward to within a short distance of the bed-plate $a$, and is held fast to the sliding bar F by the key G.

H is a perpendicular screw passing through a nut, $f$, in the top of the carriage D. To the foot of the screw H is attached the plate I I, which is held parallel to the bed-plate by the upright posts $k$ of the carriage.

The operation of the machine is as follows: Suppose the carriage to have been moved to one end of the bed-plate $a$, and the hot bar to have been drawn onto the bed-plate with its hollow side next to the straight-edge $b$. The carriage is then run over the hot bar until the arm C is opposite the point of greatest deflection from the straight edge $b$. The screw E is then revolved, forcing the step $d$ against the straight-edge $b$, which, through the nut $e$, acts upon the sliding bar F, and draws the arm C against and forces the bar to be straightened up against the straight-edge $b$. After this is done the screw is reversed and the carriage run to any other point where the hot bar does not touch the straight-edge $b$, where the same process is gone through, thus bringing the hot bar to a straight line in this direction, and if it be crooked in the other direction it can be straightened by forcing down the plate I, by means of the screw H, upon it. By these means the plate or bar is forced between two parallel surfaces, and made straight in both directions. When the bar is straightened, the carriage is run off to one end of the bed-plate, the bar is then removed on the side opposite the straight-edge, and the machine is ready for another similar operation.

Having thus fully described the construction and operation of the machine, what I claim therein as new, and desire to secure by Letters Patent, is—

The straightening of plates, beams, or bars as they come hot from the rolls by means of a movable carriage working over or in connection with a straightening-plate, and having a vertical or horizontal screw, or both, for forcing the plate, beam, or bar up against or between straight-edges, substantially as described.

Witnesses:     GEORGE H. SELLERS.
  ALBERT SHAFER,
  JOSEPH L. MEIGS.